United States Patent [19]

Bergmann et al.

[11] 4,204,380
[45] May 27, 1980

[54] DEVICE FOR CONVEYING, STACKING, AND PACKING ALIGNED LAMINATIONS OF ELECTRICAL MACHINES

[75] Inventors: Ewald Bergmann, Rechberghausen; Alfred Kottmann, Donzdorf, both of Fed. Rep. of Germany

[73] Assignee: L. Schuler GmbH, Goeppingen, Fed. Rep. of Germany

[21] Appl. No.: 877,806

[22] Filed: Feb. 15, 1978

[30] Foreign Application Priority Data

Feb. 15, 1977 [DE] Fed. Rep. of Germany ....... 2706274

[51] Int. Cl.$^2$ ........................ B32B 31/10; B32B 31/18
[52] U.S. Cl. ........................... 53/520; 53/532; 53/580; 156/378; 156/468; 156/489; 156/512; 156/519; 156/552; 156/562
[58] Field of Search ............... 156/510, 512, 519, 552, 156/562, 65, 264, 265, 297, 254, 378, 468, 558, 559, 489; 206/445, 813; 53/580, 532, 540, 520

[56] References Cited

U.S. PATENT DOCUMENTS

| | | | |
|---|---|---|---|
| 1,864,478 | 6/1932 | Ward | 156/519 X |
| 2,288,972 | 7/1942 | Millenaar | 156/264 |
| 2,968,137 | 1/1961 | DeMallie | 53/580 X |
| 3,413,177 | 11/1968 | Hoyt | 156/512 |
| 4,093,493 | 6/1978 | Welch et al. | 156/522 X |
| 4,094,720 | 6/1978 | Talbert | 156/512 X |

FOREIGN PATENT DOCUMENTS 690900  4/1953 United Kingdom.

OTHER PUBLICATIONS

"The High speed Blanking Press of Today", *Sheet Metal Industries* (British Magazine), Oct. 1974, pp. 655-656.

*Primary Examiner*—Michael G. Wityshyn
*Attorney, Agent, or Firm*—Craig and Antonelli

[57] ABSTRACT

An arrangement for feeding, stacking and packaging plate-like members punched by the die of a press of the type wherein the plate-like members are carried away initially vertically and then along a curve away from the vicinity of the press by guideways is formed of dispensers from which connecting material is fed over connecting devices adjacent the guideways into engagement with the punched members. According to preferred embodiments, the connecting material is provided with adhesive on one side, the connecting devices are spring-biased rollers, and a packet height marking mechanism is provided.

9 Claims, 5 Drawing Figures

DEVICE FOR CONVEYING, STACKING, AND PACKING ALIGNED LAMINATIONS OF ELECTRICAL MACHINES

BACKGROUND AND SUMMARY OF THE INVENTION

The invention relates to a device for feeding, stacking, and packing aligned laminations of electrical machines.

A device for feeding, stacking, and packing aligned laminations of electrical machines is described in an article entitled "The High Speed Blanking Press of Today" which appeared in the British Magazine *Sheet Metal Industries,* October, 1974, at pages 655 and 656. The article describes the laminations being punched on a press from a strip of material fed stepwise, through the dies in a lower tool. Guideways are connected directly to the lower tools, said guideways being curved and allowing the laminations to be carried away from the vinicity of the press. Hence, the guideways can be disposed crosswise or lengthwise with respect to the feed direction of the strip material, depending on spatial conditions. The punched laminations are aligned in the guideways and carried away in direct contact with one another in the form of a continuous stream and, still aligned, assembled manually into packets at the end of the guideways, for example, with wire pins or fastening bolts. Maintenance of the alignment of the laminations is an important prerequisite for further processing.

Since the guideways normally correspond exactly to the outside contours of the punched laminations, the guideways must be changed when the tool is changed. The guideways are either removed in the loaded state or are emptied before being disassembled. In the latter case, the guideways must be carefully refilled with punched laminations before operation resumes, necessitating a considerable expenditure of time, since the press can be operated only very slowly during this refilling phase.

Furthermore, the increasing numbers of strokes of high-speed presses pose problems for the packing of the punched laminations produced according to the conventional method, since the capability of one operator is exceeded. An additional operator would be required, but this is often impractical for reasons of economy.

Hence, the goal of the invention is to eliminate the disadvantages of the device described hereinabove and to provide a device for continuously combining and packaging punched laminations produced continuously in a stream.

This goal is achieved according to an aspect of the invention by the fact that automatically operating connecting devices are disposed along guideways for the punched laminations to connect the laminations together continuously.

According to advantageous embodiments, the laminations are connected by elastic material which is dispensed into the path of the lamination traveling from the punch.

A device according to an embodiment of the invention makes it possible in simple fashion to produce packs of laminations of indeterminate and/or predetermined length, wherein the punched laminations, for example, rotor and stator laminations, for an electrical machine, are stored in proper alignment and are conveyed elsewhere for further processing.

The time-consuming, slow punching which characterizes the filling process for the guideways is eliminated, since the connecting device achieves the goal and desired effect with the guideways filled with punched laminations, namely, accurate stacking of the punched laminations.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
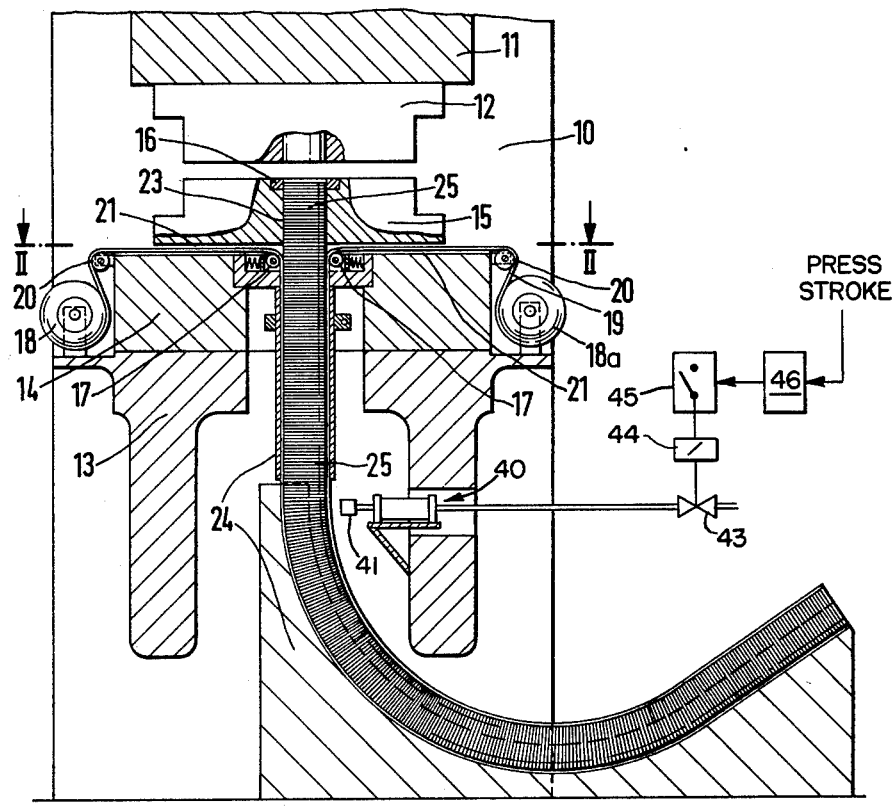
FIG. 1 is a schematic representation of a press, in partial cross section.
Figure 2:
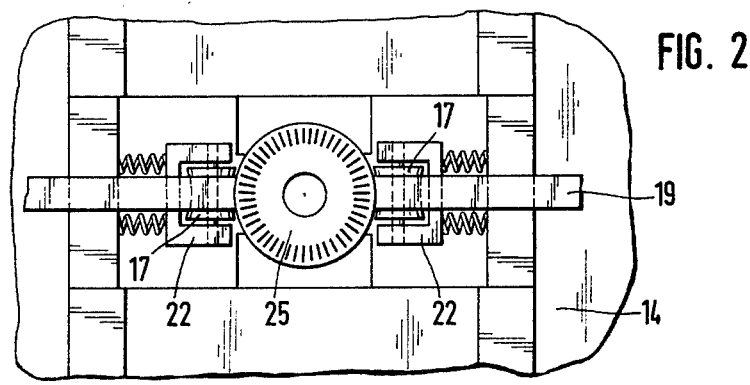
FIG. 2 is a cross section taken along line II—II of FIG. 1 on an enlarged scale.

The FIG. 1 of the drawing shows a first embodiment according to the invention which includes a press 10, with an upper tool 12 fastened to its punch 11. A tool-holding plate 14 is disposed on a press table 13, and a lower tool 15 with a die 16 is fastened to the tool-holding plate 14. Automatically operating connecting devices are provided in the vicinity of tool-holding plate 14 and lower tool 15. These connecting devices are made of support elements located opposite one another in the form of contact rollers 17 (FIG. 2) and dispensers 18, 18a. A strip of connecting material 19 is fed from each of the dispensers 18, 18a, respectively, via guide rollers 20 mounted on tool-holding plate 14 through guide slots 21, provided between lower tool 15 and tool-holding plate 14, to contact rollers 17. Contact rollers 17 are disposed directly beneath a stacking shaft 23 by means of pedestals 22 which are depressed in tool-holding plate 14 and spring-tensioned radially. Guideways 24 are provided downstream of stacking shaft 23 and are connected to the rollers 17. These guideways 24 curve away from the area of press 10 as shown in FIG. 1. The stacking shaft 23 and guideways 24 together form guide elements in which a continuous stream of aligned punched laminations 25 is conveyed continuously, always aligned and in contact with one another.

During the operation of press 10, for example, during each downward stroke of punch 12, one rotor and one stator lamination are punched out of a strip of material advanced stepwise. In the drawing, for reasons of clarity, only the device for the rotor laminations 25 is shown. The punched laminations 25, in the case of high-speed presses operating at approximately 1000 units per minute, travel from die 16 through stacking shaft 23 in proper alignment to the vicinity of contact rollers 17, which offer a slightly smaller through opening (relative to the diameter of laminations 25) by virtue of their spring-loading mounting. The strips of connecting material 19, for example, elastic strips (optionally made self-adhesive on one side) are guided over support rollers 17, whose shape is essentially the same as the outside shape of laminations 25 (FIG. 2) from both dispensers before the press starts.

Thus, when the punched plates are pushed downward the rollers 17 press the strips 19 onto the plates 25. As the punching process continues, laminations 25, still in contact with one another and properly aligned, move from stacking shaft 23 through contact rollers 17, and are connected by connecting material 19 onto a continuous strip in guideways 24. Because the plates are pushed from above, the material 19 is caused to unroll from the dispensers 18, 18a. At the end of the guideways, laminations 25, properly aligned, packaged, and in a continuous stream, are removed and stored temporarily until they are processed further.

A packet-height sensing device can be disposed along guideways 24, by means of which markings can be applied to connecting material 19, corresponding to the predetermined packet heights of laminations 25. The packet height can be determined for example by counting devices, said devices counting the number of laminations 25 supplied and activating the packet-height marking device when the desired number is reached. The stream is then interrupted at the marked points and packets of punched laminations 25 of a predetermined height, properly aligned, are obtained.

Figure 4:
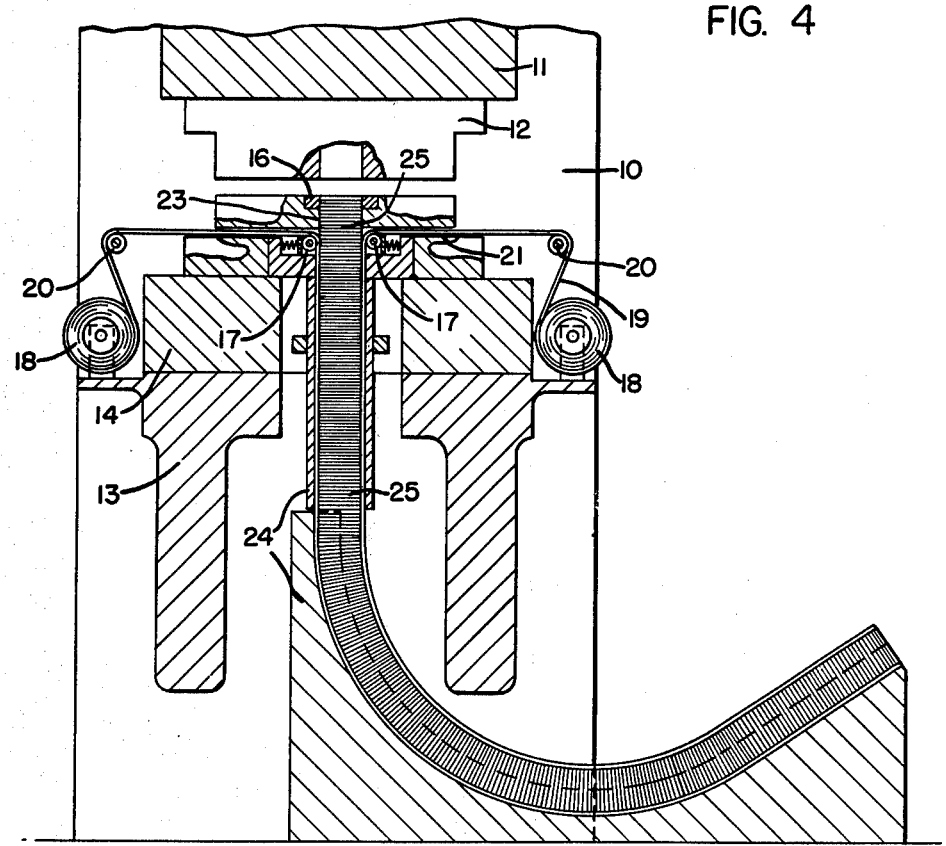
FIG. 4 is a view similar to FIG. 1, but illustrating a modified placement of the connecting device.
Figure 5:
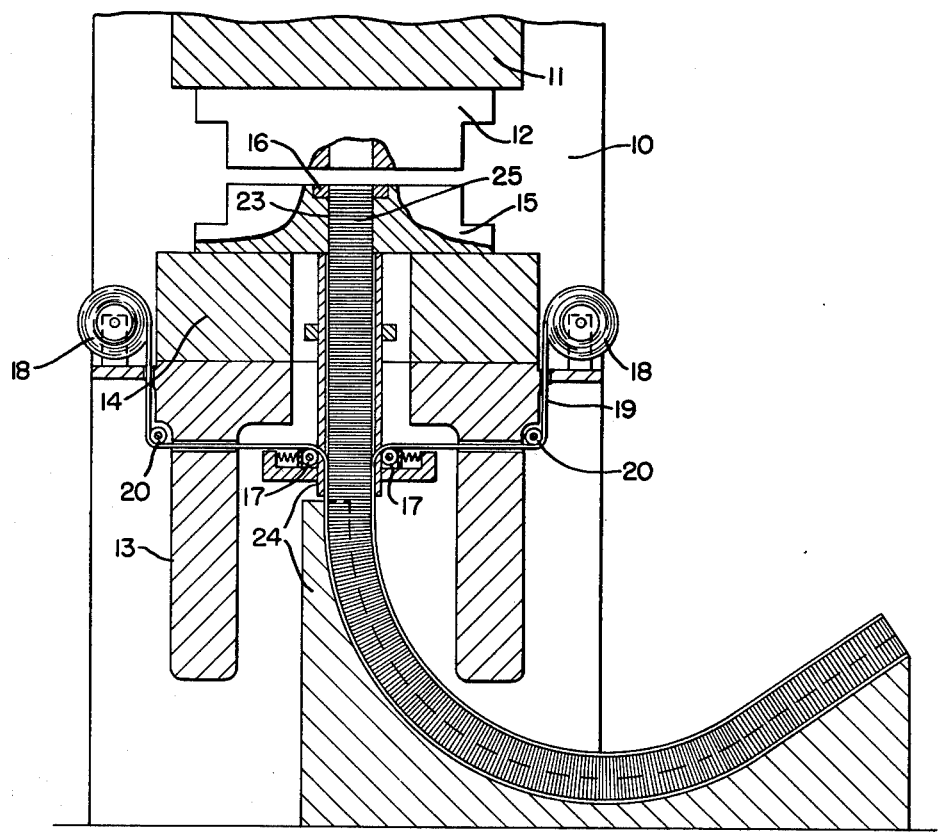
FIG. 5 is a view similar to FIG. 4, but illustrating a further modified placement of the connecting device.

For example, one suitable means for incorporating conventional counting equipment into a press of the aforenoted type is shown schematically in FIG. 1 (and while not shown in FIGS. 4 and 5, is applicable thereto). Such an arrangement is indicated generally by numeral 40 and includes a marking stamp 41 connected to the end of a piston-cylinder unit 42 mounted to press table 13.

The marker's piston-cylinder unit 42 is activated by a solenoid 44 which in turn is actuated by the closing of switch 45 when the counter 46 detects the number of strokes of the press corresponding to the desired packet height. It is noted that the nature of the counting device and the manner of its operation need not be discussed in detail since press stroke counters which generate a signal at predetermined stroke intervals are well known, and their specific construction forms no part of this invention. p Instead of the spring-loaded mounting of contact rollers 17, the latter can also be made of elastic material. Another simple and advantageous possibility is to replace the contact rollers 17 by supporting shaped elements over which the connecting material 19 is guided in a sliding manner.

Contact rollers 17 in the FIG. 1 embodiment are disposed inside tool-holding plate 14, so that tool changes are simplified. Of course, the contact rollers or supporting elements can also be mounted in lower tool 15 itself as shown in FIG. 4, whereby the corresponding rollers or elements are exchanged automatically each time the tool is changed. Disposing the rollers or elements along guideways 24 as shown in FIG. 5 may also be desirable. The construction and operation of the FIG. 4 and 5 embodiments is otherwise unchanged from that of FIG. 1.

Furthermore, the contact rollers or supporting elements can be mounted in the vicinity of guideways 23, 24 in such manner that they rotate around guideways 23, 24 along a circular path, thus wrapping the connecting material 19 helically about the continuous stream of aligned laminations 25. In a device of this kind (not illustrated) an active connecting device (17, 18) i.e., provided with drive means, must be provided, while the devices described hereinabove operate passively and automatically, in other words they require no drive means.

Figure 3:
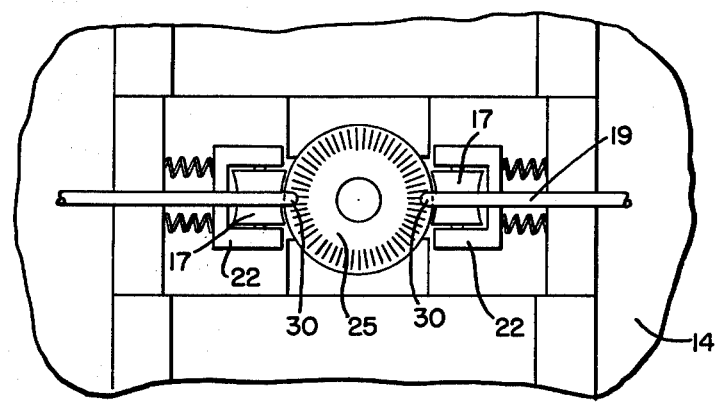
FIG. 3 is a view similar to FIG. 2, but illustrating a modified connecting strip embodiment.

Depending on the application and requirements, connecting materials 19 can be made of strips which are self-adhesive on one side, for example, made of elastic material with reinforcement, thermoplastic strips, or perforated strips, in which case the pressure of the rollers against the laminations 25 as they pass therebetween will cause the strips to adhere to the laminations 25. However, the use of adhesive, while advantageous, is not necessary and another embodiment of a device according to the invention consists in providing the connecting material 19 in grooves 30 of the punched laminations 25 as shown in FIG. 3. The grooves can be the existing grooves or grooves punched especially for the connecting material. The material 19 is pressed into the grooves 30 of the laminations 25 by the rollers 17 and secures the laminations together by a clamping effect.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A device for feeding, stacking, and packaging aligned laminations of electrical machines punched by a press from a strip of material fed stepwise and carried away by guide elements, said guide elements guiding the laminations initially vertically and then along a curve away from the vicinity of the press, whereby the guide elements are formed by at least one stacking shaft located downstream of a die of a cutting tool and guideways associated with said stacking shaft, comprising automatically operating connecting devices disposed along the guideways by means of which connecting devices the aligned laminations, traveling along in a continuous stream, can be connected continuously with one another, characterized by the fact that the connecting devices are made of elements of a unit, by the fact that connecting material is continuously guided over the elements of the unit from appropriately disposed dispensers to the line of punched laminations to be connected together, by the fact that the elements of the unit are made of elastic material, are mounted along the path of the guide elements, extend into the path of the laminations carried by the guide elements, and are mounted for displacement outwardly with respect to said path under the influence of laminations fed along said path for adapting the elements of the unit to outside contours of the laminations to be connected, characterized by the fact that the connecting material consists of non-adhesive strips, and said connecting devices conform to the peripheral shape of the laminations and are operable to insert said strips in a self-holding manner into grooves in said laminations.

2. Device according to claim 1, characterized by the fact that the elements of the unit are mounted in a spring-loaded fashion along the path of guide elements.

3. Device according to claim 1, characterized by the fact that the elements of the unit are mounted at the lower end of the stacking shaft inside a lower tool of said press.

4. Device according to claim 1, characterized by the fact that the elements of the unit are disposed below a lower tool of said press in the vicinity of a press table.

5. Device according to claim 1, characterized by the fact that the elements of the unit are made in the form of rollers.

6. A device according to claim 1, characterized by the fact that the connecting material consists of thermoplastic strips.

7. A device according to claim 1, characterized by the fact that a packet height sensing device is disposed along the path of the guide elements.

8. A device according to claim 7, characterized by the fact that the packet height sensing device is activatable by a counter which determines the number of laminations punched, and leaves a mark indicating the height of the packet on the connecting material by means of a marking device.

9. A device according to claim 1, wherein the periphery of said laminations is curved and said rollers are contoured to conform to the curved periphery of said laminations.

* * * * *